(12) United States Patent
Kato et al.

(10) Patent No.: US 10,940,644 B2
(45) Date of Patent: Mar. 9, 2021

(54) AUTOMATIC CHARGING APPARATUS

(71) Applicant: Mitsubishi Electric Corporation, Chiyoda-ku (JP)

(72) Inventors: Naoto Kato, Chiyoda-ku (JP); Seiichiro Arakawa, Chiyoda-ku (JP); Eiji Tsuzuki, Chiyoda-ku (JP); Kazuma Shioda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 10 days.

(21) Appl. No.: 15/775,861

(22) PCT Filed: Nov. 25, 2016

(86) PCT No.: PCT/JP2016/085023
§ 371 (c)(1),
(2) Date: May 14, 2018

(87) PCT Pub. No.: WO2018/096660
PCT Pub. Date: May 31, 2018

(65) Prior Publication Data
US 2019/0283336 A1 Sep. 19, 2019

(51) Int. Cl.
*B29C 65/54* (2006.01)
*B32B 3/12* (2006.01)
(Continued)

(52) U.S. Cl.
CPC .............. *B29C 65/542* (2013.01); *B05C 5/02* (2013.01); *B29C 70/86* (2013.01); *B32B 3/12* (2013.01);
(Continued)

(58) Field of Classification Search
CPC ... B29C 65/524; B29C 65/542; B29C 66/725; B29C 66/7252; B29C 66/72521;
(Continued)

(56) References Cited

U.S. PATENT DOCUMENTS 4,661,368 A * 4/1987 Rohde ................. B05C 11/1013
118/323
2004/0065254 A1* 4/2004 Ikeuchi ................... H01J 9/227
118/300
(Continued)

FOREIGN PATENT DOCUMENTS

FR   2990890 A1 * 11/2013 ............. B23B 41/00
JP   59-144777 U    9/1984
(Continued)

OTHER PUBLICATIONS

Translation of FR 2990890 A1, Nov. 2013, Jolin Alain (Year: 2013).*
International Search Report dated Feb. 21, 2017 in PCT/JP2016/085023, filed Nov. 25, 2016.

*Primary Examiner* — George R Koch
(74) *Attorney, Agent, or Firm* — Oblon, McClelland, Maier & Neustadt, L.L.P.

(57) ABSTRACT

In a state in which an insert (310) is embedded in an embedding opening of a panel (300) and a nozzle (211) of a dispenser (210) is located above an injection hole of the insert, an air cylinder (230) presses an edge of a discharge port (212) of the nozzle on an edge of the injection hole of the insert. Subsequently, the dispenser discharges an adhesive from the discharge port of the nozzle. The adhesive is injected from the injection hole of the insert, and fills a gap between the insert and the panel. Therefore, the insert is fixed to the panel.

9 Claims, 16 Drawing Sheets

(51) Int. Cl.
  *B32B 7/12*   (2006.01)
  *F16B 5/00*   (2006.01)
  *B05C 5/02*   (2006.01)
  *B29C 70/86*  (2006.01)
  *C09J 5/00*   (2006.01)
  *B29C 37/00*  (2006.01)

(52) U.S. Cl.
  CPC .................................... *B32B 7/12* (2013.01);
      *C09J 5/00* (2013.01); *F16B 5/00* (2013.01);
      *B29C 37/0082* (2013.01)

(58) Field of Classification Search
  CPC ........ B29C 66/72523; B29C 66/72525; B29C
       66/7254; B32B 3/12; B32B 7/12; B32B
       37/146
  See application file for complete search history.

(56) References Cited

U.S. PATENT DOCUMENTS

| | | | | |
|---|---|---|---|---|
| 2009/0236025 A1* | 9/2009 | Burkus | ............... | B01F 7/00258 |
| | | | | 156/60 |
| 2016/0001501 A1* | 1/2016 | Kogl | ....................... | B29C 65/48 |
| | | | | 156/66 |
| 2017/0146984 A1* | 5/2017 | Coon | ............... | G05B 19/41805 |

FOREIGN PATENT DOCUMENTS

| JP | 2-109893 A | 4/1990 |
|---|---|---|
| JP | 4-244695 A | 9/1992 |
| JP | 5-31427 A | 2/1993 |
| JP | 10-43655 A | 2/1998 |
| JP | 2001-140362 A | 5/2001 |
| JP | 2001-271424 A | 10/2001 |

* cited by examiner

AUTOMATIC CHARGING APPARATUS

This application is a 371 of PCT/JP2016/085023, filing date Nov. 25, 2016.

TECHNICAL FIELD

The present invention relates to a technology that charges a filler automatically.

BACKGROUND ART

A lightweight and high-rigidity honeycomb sandwich panel is frequently used for a structure such as an artificial satellite, a flying object, or automotive shelter.

The honeycomb sandwich panel has a structure in which epidermis materials stuck to both surfaces of a honeycomb core using sheet-like adhesives. An insert is embedded in the honeycomb sandwich panel. The insert is a metal component which is an interface used to connect a member or a device to the honeycomb sandwich panel, and has holes into which the adhesives are injected. The adhesives are examples of filler.

After the insert is embedded in the honeycomb sandwich panel, the adhesives are injected from the holes of the insert and fill a space between the insert and the honeycomb core. Furthermore, in a case where the adhesives harden, the insert is fixed to the honeycomb sandwich panel.

Patent Literature 1 discloses an insert charging method.

An epoxy adhesive obtained by mixing two liquids is frequently used in order to fix the insert. The epoxy adhesive obtained by mixing two liquids is an adhesive obtained by mixing a high-viscosity main agent and a low-viscosity curing agent.

The amount of distribution of the main agent and the curing agent is determined, and the main agent is mixed with the curing agent after the respective masses are measured.

From a viewpoint of quality control, it is necessary to leave an operation record with regard to a mixture of the main agent and the curing agent. Therefore, it is necessary to record mixture start time.

Since the pot life of the adhesive is short, operations for performing mixture and record are frequently generated.

In addition, in order to prevent a charging operation from being omitted, it is necessary to record locations of holes after the adhesives are injected from the holes of the inserts.

In a case where the number of the inserts is large, time is required for not only the charging operation but also a recording operation performed after the charging operation.

CITATION LIST

Patent Literature

[Patent Literature 1] JP 2001-140362 A

SUMMARY OF INVENTION

Technical Problem

An object of the present invention is to enable automatic charging of a filler.

Solution to Problem

An automatic charging apparatus according to the present invention includes:

an operation stage placed with a panel provided with an embedding hole to which an insert is to be embedded;

a dispenser that includes a discharge port through which a filler injected from an injection hole provided in the insert is discharged; and an air cylinder to press an edge of the discharge port of the dispenser on an edge of the injection hole of the insert in a state where the panel is placed on the operation stage and the insert is embedded in the embedding hole in the panel.

Advantageous Effects of Invention

According to the present invention, it is possible to charge a filler automatically.

DESCRIPTION OF EMBODIMENTS

Figure 1:
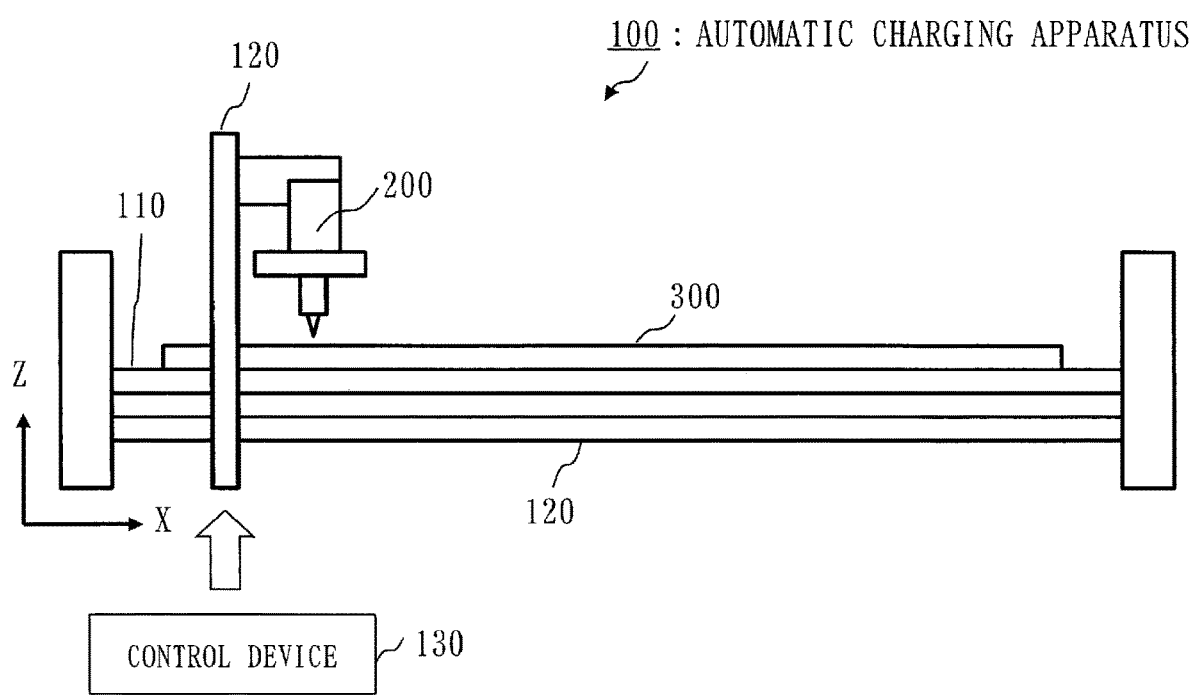
FIG. 1 is a side view illustrating an automatic charging apparatus 100 according to a first embodiment.

In embodiments and drawings, the same reference symbols are attached to the same components or equivalent components. Descriptions of the components, to which the same reference symbols are attached, are appropriately omitted or simplified. Arrows in the drawings mainly indicate flows of data or processes.

First Embodiment

An aspect, in which a gap between a honeycomb sandwich panel and an insert embedded in the honeycomb sandwich panel is automatically filled with an adhesive, will be described with reference to FIGS. 1 to 14.

Description of Configuration

A configuration of an automatic charging apparatus 100 will be described with reference to FIG. 1 and FIG. 2.

Figure 2:
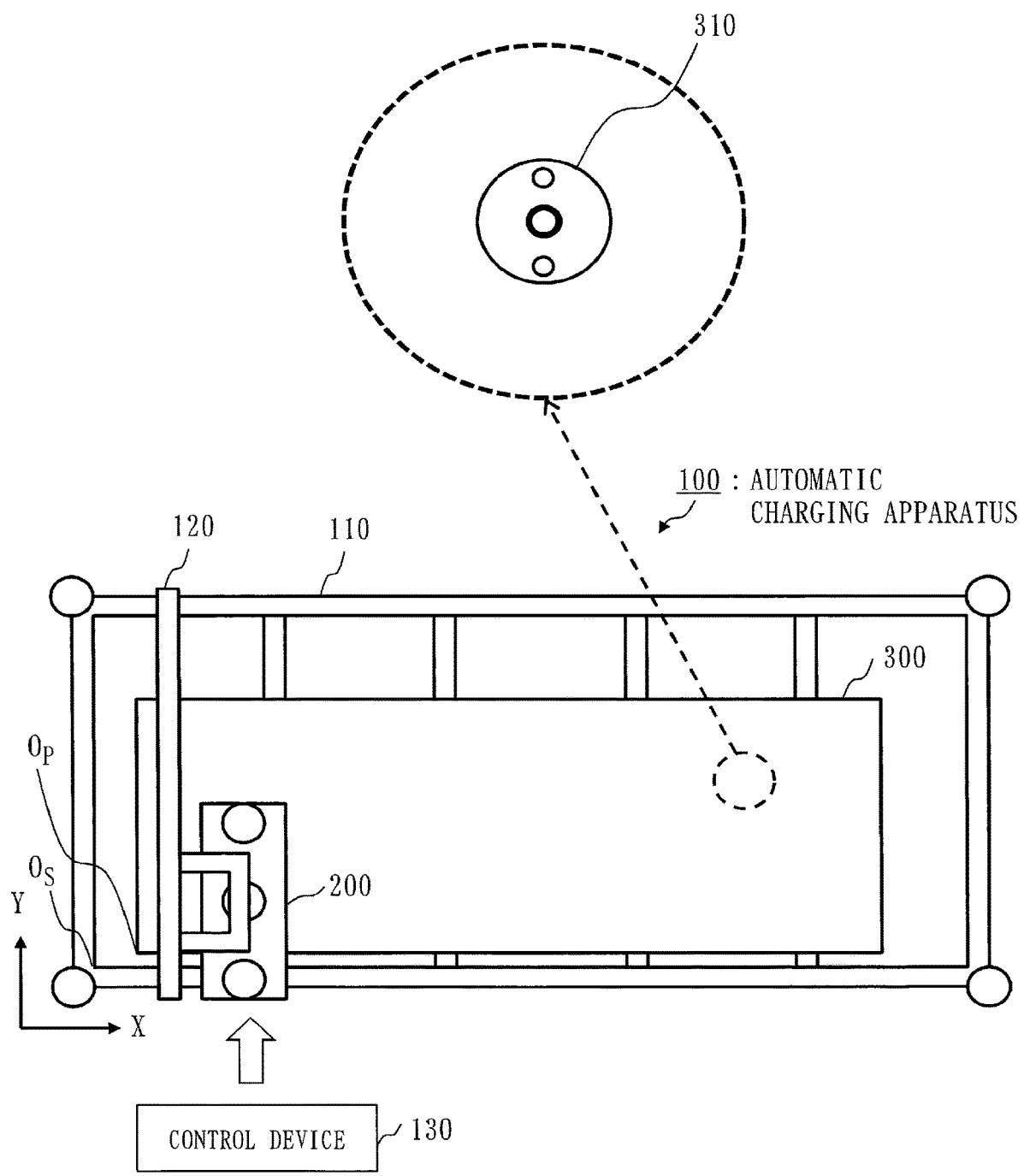
FIG. 2 is a plan view illustrating the automatic charging apparatus 100 according to the first embodiment.

FIG. 1 is a side view and FIG. 2 is a plan view.

An X axis indicates a width direction, a Y axis indicates a depth direction, and a Z axis indicates a height direction. In other words, the X axis indicates a front and rear direction, the Y axis indicates a right and left direction, and the Z axis indicates an up and down direction.

$O_S$ indicates an origin of an operation stage 110 and $O_P$ indicates an origin of a panel 300.

The automatic charging apparatus 100 includes the operation stage 110, a movement stage 120, a control device 130, and a driving head 200.

The operation stage 110 is a stand on which the panel 300 is placed.

The movement stage 120 is a frame to which the driving head 200 is attached. The movement stage 120 electrically moves in the front and rear direction. In addition, a part to which the driving head 200 is attached electrically moves in the right and left direction.

The panel 300 is a plate provided with an embedding opening in which an insert 310 is embedded (see FIG. 2).

A size of the panel 300 is approximately 0.4 m×0.6 m in a case of a small panel and is approximately 3 m×5 m in a case of a large panel. In addition, the number of embedding openings which are provided in the panel 300 is approximately 50 to 3000. The embedding opening is a depression. The embedding opening is provided through an opening punching process using a drilling machine or the like. Note that m means a meter.

A structure of the insert 310 will be described with reference to FIG. 3.

Figure 3:
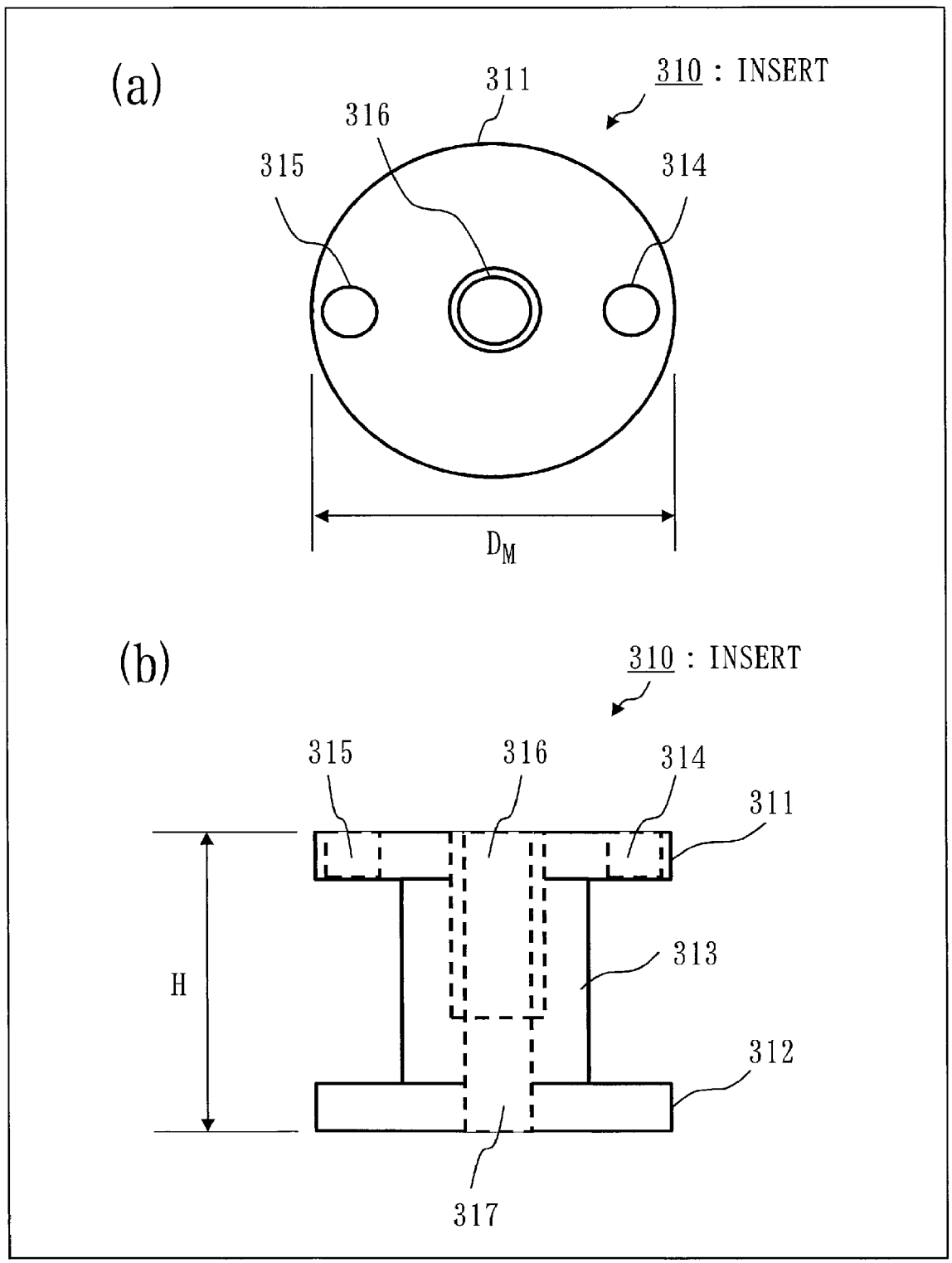
FIG. 3 is a structural diagram illustrating an insert 310 according to the first embodiment.

(a) of FIG. 3 is a plan view and (b) of FIG. 3 is a side view.

The insert 310 is a component used to connect an object to the panel 300. Specifically, the insert 310 is a component which is made of metal. The connected object is any member or equipment.

The insert 310 includes an upper flange 311, a lower flange 312, and a flange shaft 313.

The upper flange 311 is a flange which is disposed on an upper side. The upper flange 311 forms a disk shape.

The upper flange 311 is provided with a screw opening 316 at a center, and is provided with two holes which interpose the screw opening 316 therebetween. The two holes are located at approximately symmetric positions while interposing the screw opening 316 therebetween. One hole is referred to as an injection hole 314 and the other hole is referred to as a measurement hole 315. The injection hole 314 and the measurement hole 315 pass through the upper flange 311.

The lower flange 312 is a flange which is disposed on a lower side. The lower flange 312 forms a disk shape. The lower flange 312 is provided with an axial hole 317 at a center. Meanwhile, the lower flange 312 does not include a hole corresponding to the injection hole 314 or the measurement hole 315.

The flange shaft 313 is a shaft which connects the upper flange 311 to the lower flange 312. The flange shaft 313 forms a cylindrical shape. The flange shaft 313 is provided with the screw opening 316, which is formed from the upper flange 311 to the middle of the flange shaft 313, and the axial hole 317 which is connected to the screw opening 316 and which extends to the lower flange 312.

A detailed size of the insert 310 is as below.

Diameters $D_M$ of the upper flange 311 and the lower flange 312 range from approximately 1 cm to 10 cm where cm means centimeter.

A height H of the insert 310 ranges from approximately 1 cm to 5 cm. Meanwhile, the height H of the insert 310 is approximately the same as a depth of the embedding opening provided in the panel 300.

A shape and a dimension of the insert 310 according to the embodiment are examples, and the shape and the dimension of the insert 310 may be different from the shape and the dimension illustrated in the embodiment.

A structure of the panel 300 will be described with reference to FIG. 4 and FIG. 5.

Figure 4:
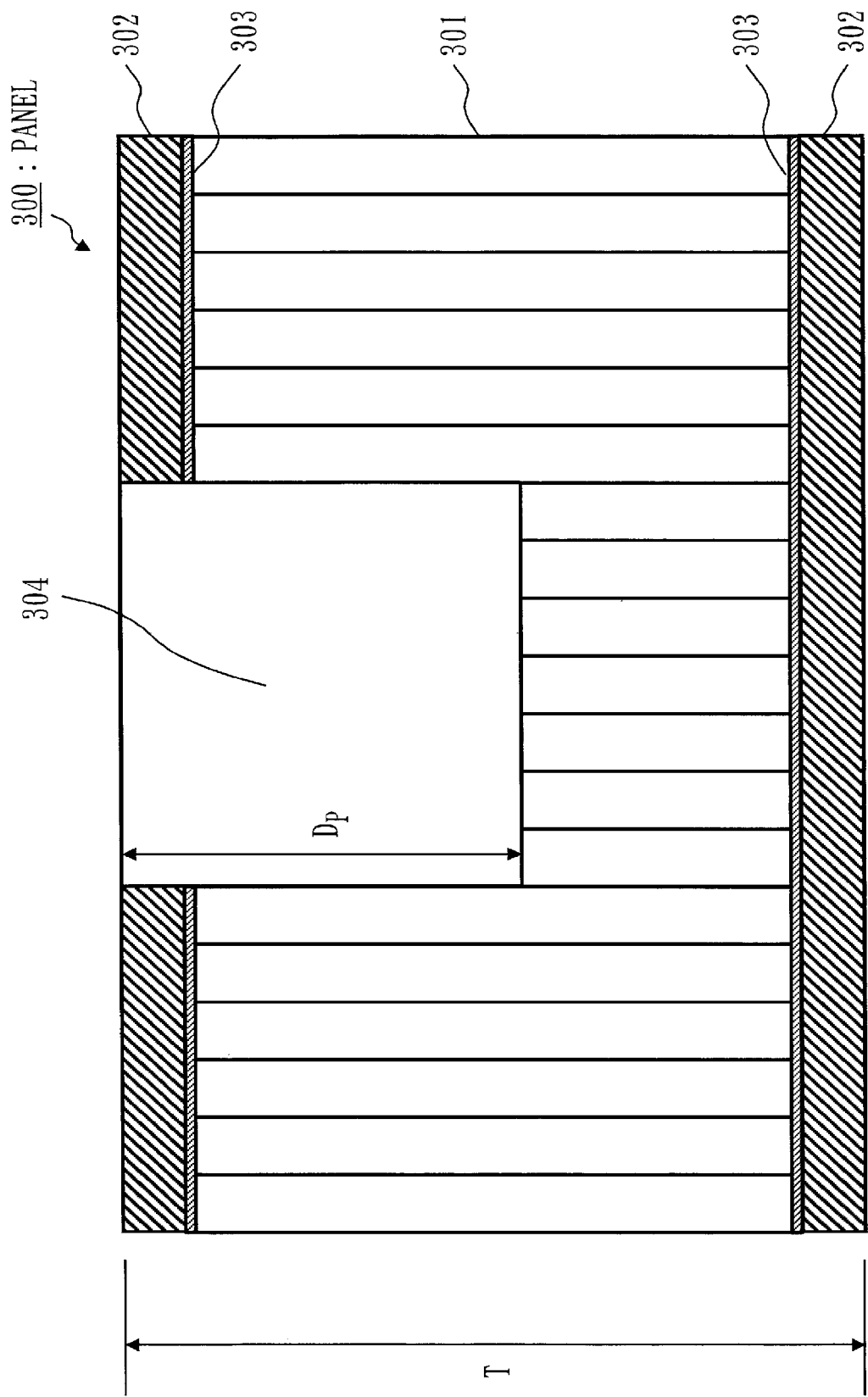
FIG. 4 is a structural diagram illustrating a panel 300 according to the first embodiment.
Figure 5:
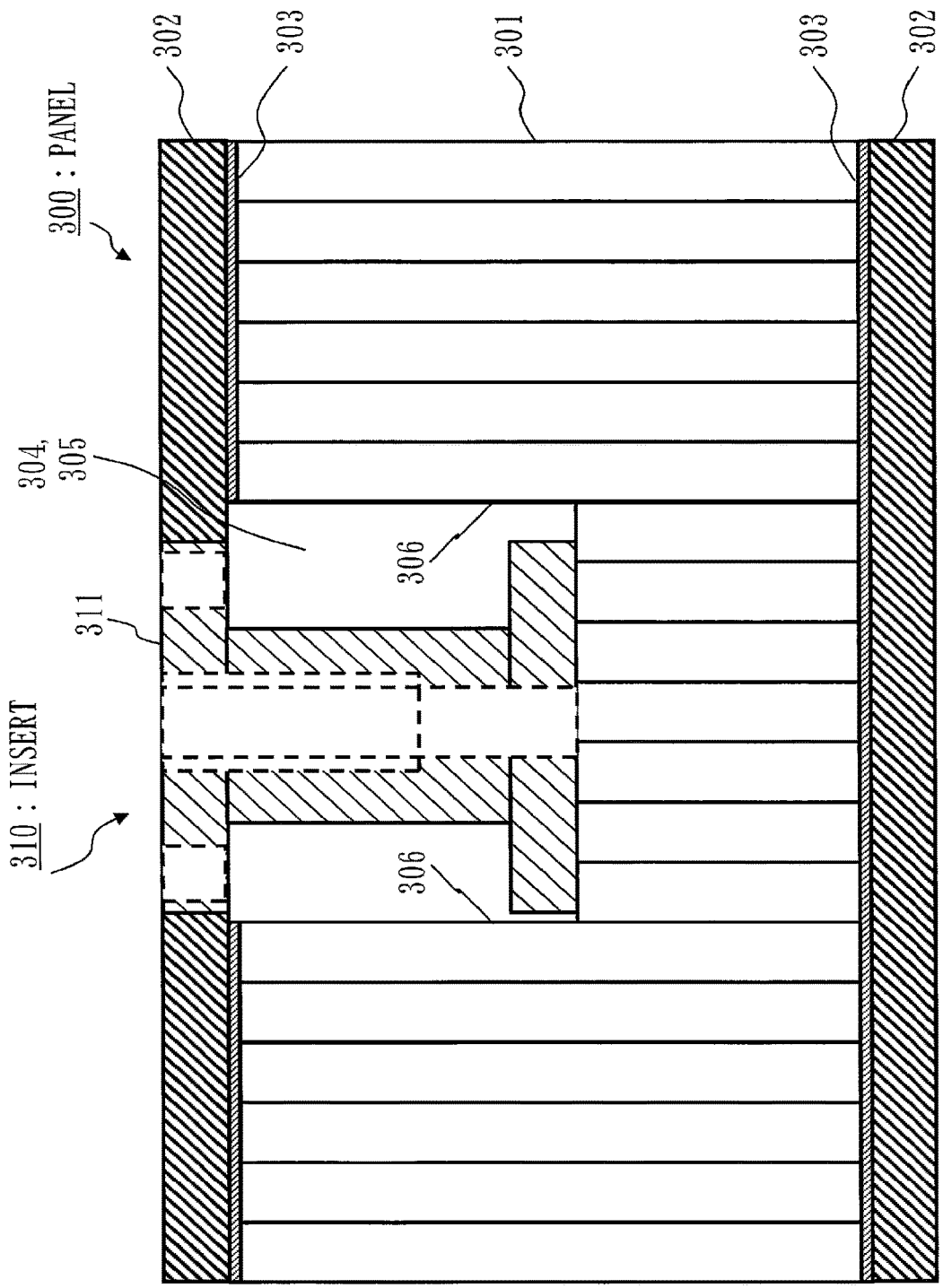
FIG. 5 is a structural diagram illustrating the panel 300 according to the first embodiment.

FIG. 4 and FIG. 5 are sectional side views.

Specifically, the panel 300 is the honeycomb sandwich panel which is used for a structure such as an artificial satellite.

As illustrated in FIG. 4, the panel 300 includes a honeycomb core 301 and two epidermis materials 302, and is formed by interposing the honeycomb core 301 between the epidermis materials 302.

The honeycomb core 301 includes a plurality of polygonal prisms (specifically, hexagonal cylinders) which are connected to each other. Meanwhile, each of the plurality of polygonal prisms forms a cylindrical shape.

The epidermis materials 302 are bonded to an upper part and a lower part of the honeycomb core 301 by adhesive sheets 303. Specifically, the epidermis materials 302 are formed of aluminum or Carbon Fiber Reinforced Plastic (CFRP). The adhesive sheets 303 are sheet-shaped adhesives.

There are several kinds of panels 300, and a thickness T of each of the panels 300 ranges from approximately 1 cm to 5 cm.

In addition, a depth $D_P$ of an embedding opening 304 is lower than the thickness T of the panel 300. For example, the depth $D_P$ of the embedding opening 304 is approximately a half of the thickness T of the panel 300.

As illustrate in FIG. 5, in a case where the insert 310 is embedded in the embedding opening 304, a height of a surface of the upper flange 311 of the insert 310 is approximately the same as that of a surface of the upper-side epidermis material 302.

A gap 305 between the insert 310 and the honeycomb core 301 is filled with filler.

The gap 305 between the insert 310 and the honeycomb core 301 means a gap between the insert 310, which is embedded in the embedding opening 304, and walls 306, which are adjacent to the insert 310, among walls which form the honeycomb core 301.

Specifically, an adhesive which fixes the insert 310 to the honeycomb core 301 is charged as the filler.

A configuration of the driving head 200 will be described with reference to FIG. 6 and FIG. 7.

Figure 6:
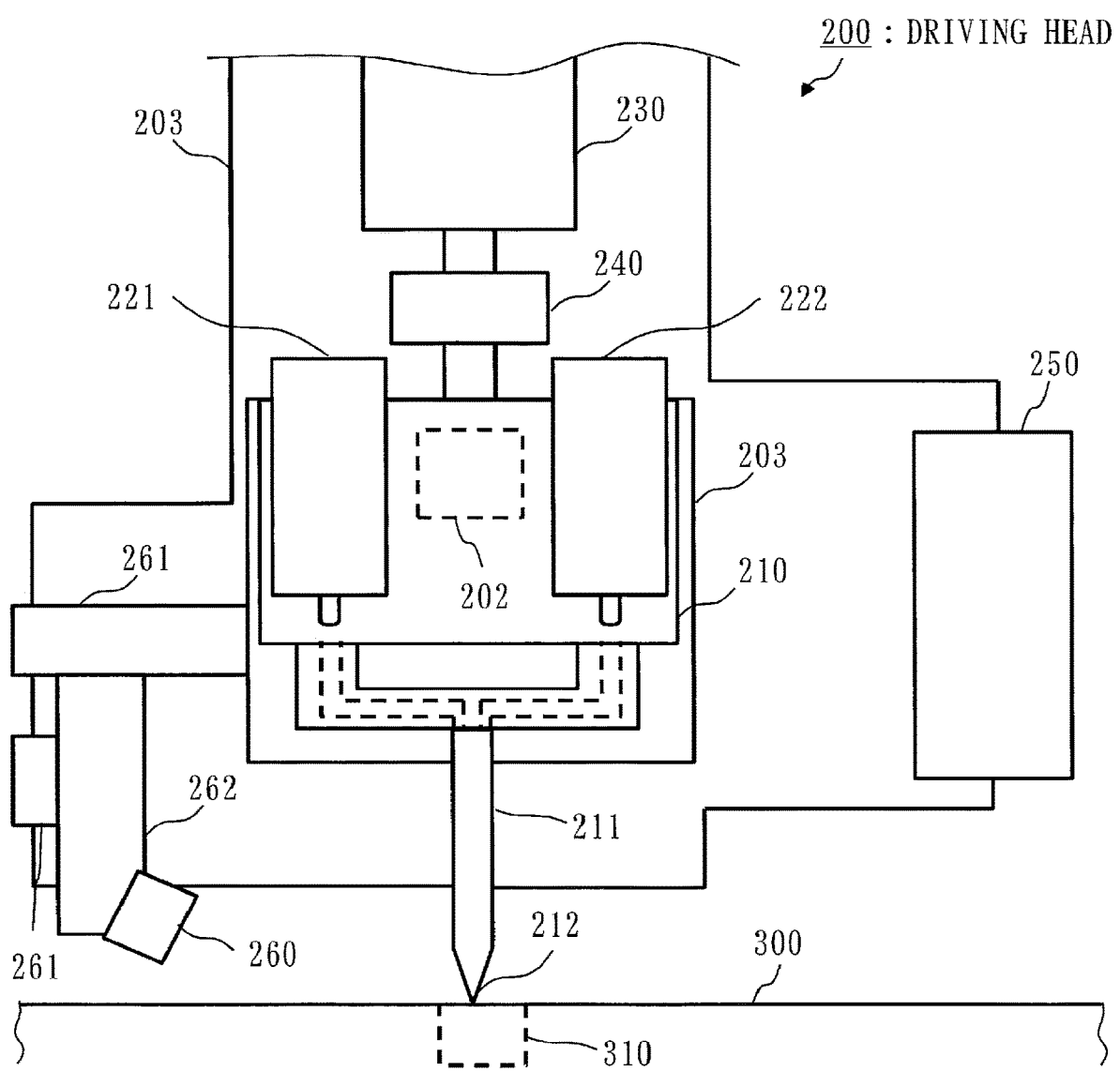
FIG. 6 is a front view illustrating a driving head 200 according to the first embodiment.
Figure 7:
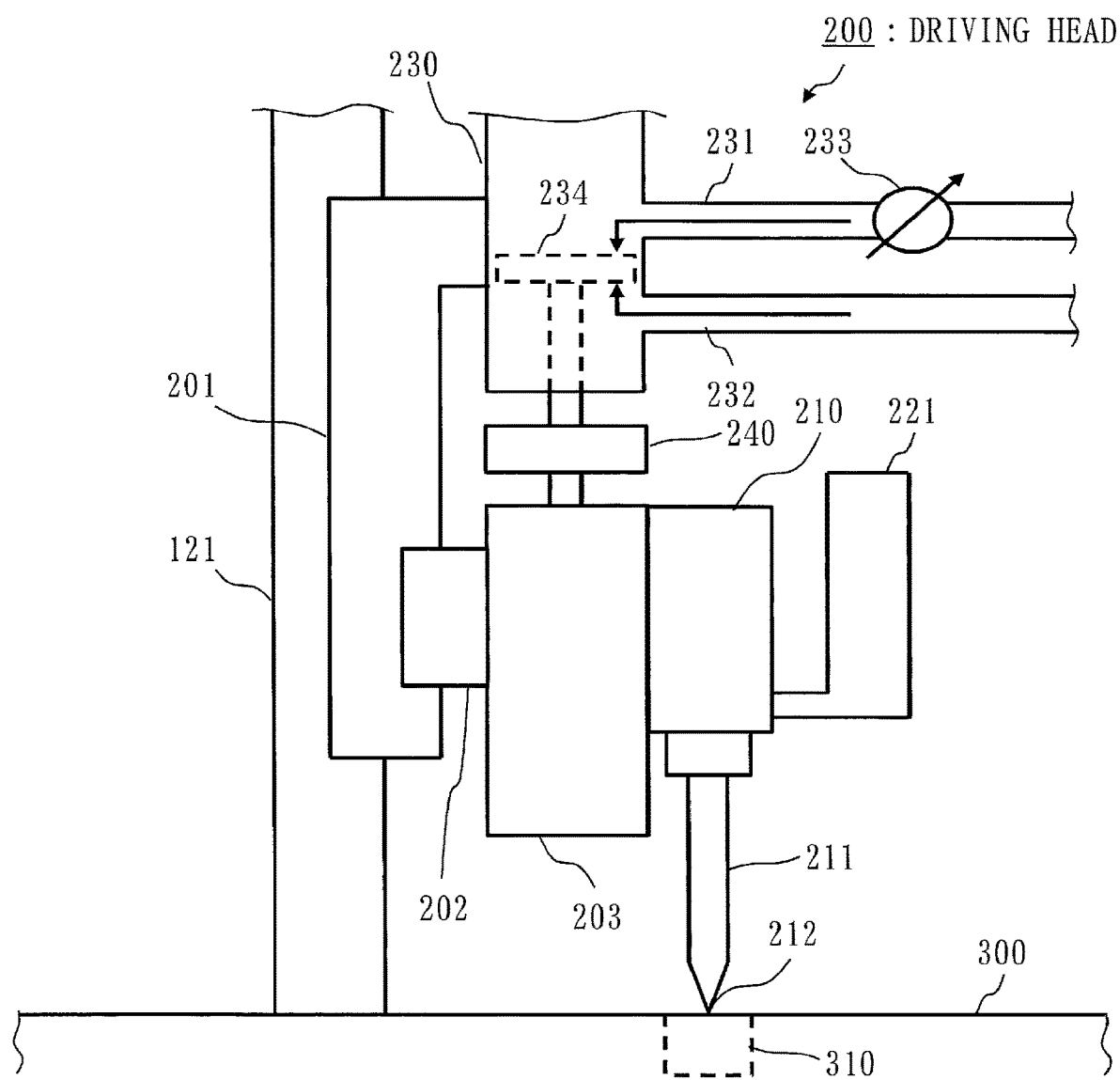
FIG. 7 is a side view illustrating the driving head 200 according to the first embodiment.

FIG. 6 is a front view and FIG. 7 is a side view.

Meanwhile, although FIG. 6 illustrates parts which are related to a camera 250 and a laser displacement meter 260, FIG. 7 does not illustrate the parts which are related to the camera 250 and the laser displacement meter 260.

The driving head 200 is a device which causes the gap 305 between the insert 310 and the honeycomb core 301 to be filled with the filler.

The driving head 200 includes a dispenser 210, a first tank 221, a second tank 222, an air cylinder 230, a load cell 240, the camera 250, and the laser displacement meter 260.

Furthermore, the driving head 200 includes a movement block 201, a linear guide 202, and a base plate 203.

Furthermore, the driving head 200 includes an adjustment guide 261 and a base plate 262.

The movement block 201 is attached to a rail 121 of the movement stage 120, and electrically moves upward and downward along the rail 121.

The linear guide 202 is attached to the movement block 201, and moves upward and downward together with the movement block 201 in a case where the movement block 201 moves upward and downward. In addition, the linear guide 202 electrically moves upward and downward.

The base plate 203 is attached to the linear guide 202, and moves upward and downward together with the linear guide 202 in a case where the linear guide 202 moves upward and downward.

The dispenser 210 is a device which discharges the filler.

The dispenser 210 includes a nozzle 211.

The nozzle 211 includes a discharge port 212, through which the filler is discharged, at a tip.

Specifically, the nozzle 211 is a static mixer which stirs and mixes a plurality of liquids.

The first tank 221 is a container which stores a first liquid that forms the filler. The first liquid is supplied from the first tank 221 to the dispenser 210.

The second tank 222 is a container which stores a second liquid that forms the filler. The second liquid is supplied from the second tank 222 to the dispenser 210.

The filler is a mixed liquid obtained by mixing the first liquid and the second liquid. Specifically, the filler is an epoxy adhesive obtained by mixing two liquids, the first liquid is a high-viscosity main agent, and the second liquid is a low-viscosity curing agent. The epoxy adhesive obtained by mixing two liquids is an adhesive obtained by mixing the high-viscosity main agent and the low-viscosity curing agent. Meanwhile, middle-viscosity or high-viscosity filler is selected such that the filler does not leak from a minute hole even in a case where the minute hole is generated on the wall of the honeycomb core 301.

The air cylinder 230 is a device which causes the nozzle 211 of the dispenser 210 to move upward and downward by moving the base plate 203 upward and downward.

The air cylinder 230 includes a first pipe 231, a second pipe 232, a regulator 233, and a piston 234.

The regulator 233 is a device which causes the piston 234 to move upward and downward using air pressure by adjusting air which flows through the first pipe 231 and air which flows through the second pipe 232. In a case where the piston 234 moves upward and downward, the nozzle 211 of the dispenser 210 moves upward and downward together with the base plate 203. Specifically, the regulator 233 is an electropneumatic regulator.

The load cell 240 is a sensor which measures pressing force.

The pressing force is force which causes an edge of the discharge port 212 of the nozzle 211 to be pressed on an edge of the injection hole 314 of the insert 310.

Specifically, the load cell 240 measures force, which is generated in a case where the air cylinder 230 presses the base plate 203 down, as the pressing force.

The camera 250 is a device which captures the insert 310 which is located below the nozzle 211 of the dispenser 210.

The adjustment guide 261 is attached to the movement block 201, and moves upward and downward together with the movement block 201 in a case where the movement block 201 moves upward and downward. In addition, the adjustment guide 261 electrically moves upward, downward, rightward, and leftward.

The base plate 262 is attached to the adjustment guide 261, and moves together with the adjustment guide 261 in a case where the adjustment guide 261 moves.

The laser displacement meter 260 is a device which emits a laser beam toward a lower side of the nozzle 211 of the dispenser 210 and measures a distance up to a reflection point. The reflection point is a spot where the laser beam is reflected.

Specifically, the laser displacement meter 260 emits the laser beam toward the measurement hole 315 of the insert 310 which is located on the lower side of the nozzle 211, and measures a distance up to a liquid surface of the filler which is injected from the injection hole 314 of the insert 310.

Figure 8:
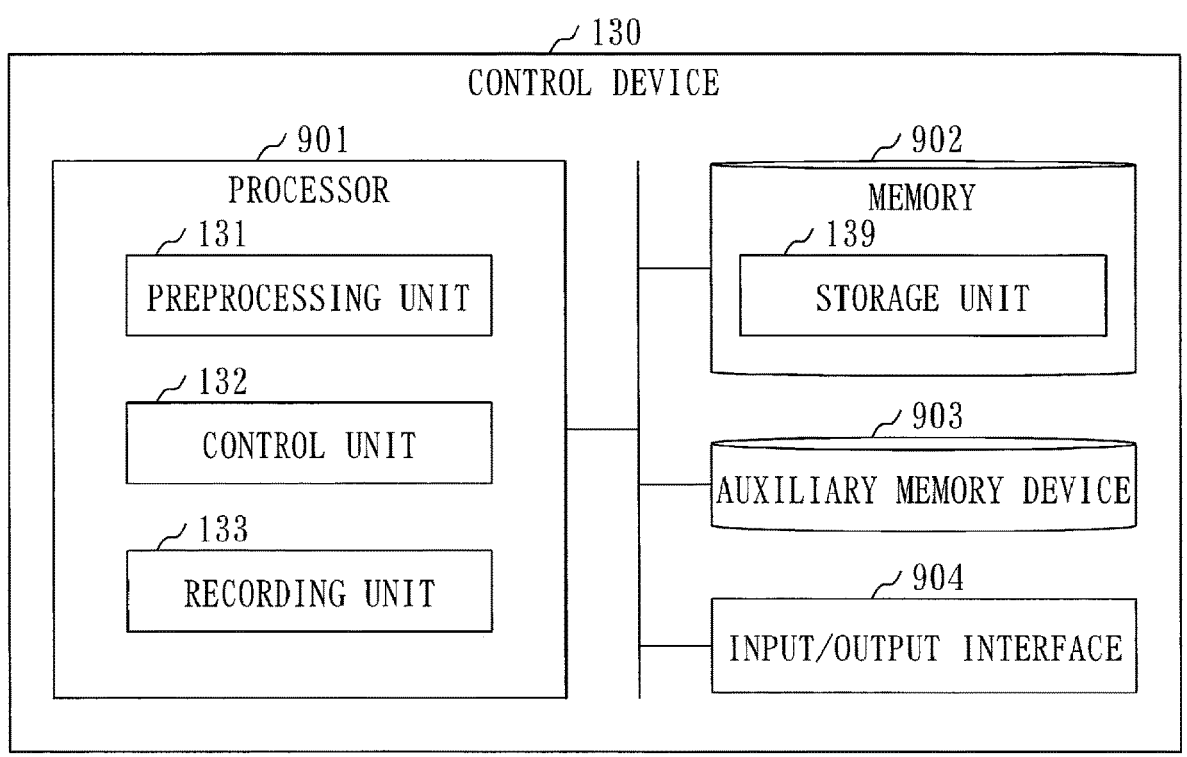
FIG. 8 is a configuration diagram illustrating a control device 130 according to the first embodiment.

A configuration of the control device 130 will be described with reference to FIG. 8.

The control device 130 is a computer which controls the movement stage 120 and the driving head 200.

The control device 130 includes hardware such as a processor 901, a memory 902, an auxiliary storage device 903, and an input/output interface 904. Each of the hardware is connected through a signal line.

The processor 901 is an Integrated Circuit (IC) which performs arithmetic processing, and controls the other hardware. Specifically, the processor 901 is a Central Processing Unit (CPU).

The memory 902 is a volatile storage device. The memory 902 is referred to as a main storage device or a main memory. Specifically, the memory 902 is a Random Access Memory (RAM).

The auxiliary storage device 903 is a non-volatile storage device. Specifically, the auxiliary storage device 903 is a ROM, an HDD, or a flash memory. The ROM is an abbreviation of a Read Only Memory, and the HDD is an abbreviation of a Hard Disk Drive.

The input/output interface 904 is a port to which a cable connected to the movement stage 120 and a cable connected to the driving head 200 are connected.

The control device 130 includes functional elements such as a preprocessing unit 131, a control unit 132, and a recording unit 133. The functional elements are elements which configure functions of the control device 130. The functional elements are realized by software. The respective functional elements will be described later.

The auxiliary storage device 903 stores a program which realizes the functional elements. The program which realizes the functional elements is loaded to the memory 902 and is executed by the processor 901.

Furthermore, the auxiliary storage device 903 stores an Operating System (OS). At least a part of the OS is loaded to the memory 902 and is executed by the processor 901.

That is, the processor 901 executes the program which realizes the functional elements while executing the OS.

Data, obtained by executing the program which realizes the functional elements, is stored in a storage device which is referred to as the memory 902, the auxiliary storage device 903, a register in the processor 901 or a cache memory in the processor 901.

The memory 902 functions as a storage unit 139 which stores the data. However, another storage device may function as the storage unit 139 instead of the memory 902 or together with the memory 902.

The control device 130 may include a plurality of processors which replace the processor 901. The plurality of processors perform division and take charge of execution of the program which realizes the functional elements.

It is possible to store the program which realizes the functional elements in a non-volatile storage medium, such as a magnetic disk, an optical disk, or a flash memory, to be read by the computer. The non-volatile storage medium is a non-transitory tangible medium.

Description of Operation

An operation of the automatic charging apparatus 100 corresponds to an automatic charging method.

An operation of the control device 130 corresponds to a charging control method. A procedure of the charging control method corresponds to a procedure of a charging control program.

Processes which are performed by the preprocessing unit 131, the control unit 132, and the recording unit 133 are respectively referred to as preprocessing, control processing, and record processing.

The preprocessing of the automatic charging method will be described before the automatic charging method is described.

The preprocessing of the automatic charging method is a process for correcting location information which indicates a coordinate value of the discharge port 212 of the nozzle 211. The location information is stored in the control device 130 in advance. An origin of coordinates in initial location information is the origin $O_S$ (see FIG. 2) of the operation stage 110.

The preprocessing of the automatic charging method is performed in a state in which the panel 300 is disposed on the operation stage 110 and the inserts 310 are embedded in the embedding openings 304 of the panel 300.

Meanwhile, the inserts 310 are embedded in the embedding openings 304 in predetermined orientation. Specifically, each insert 310 is embedded in an embedding opening 304 such that the injection hole 314 and the measurement hole 315 are aligned in the Y axis direction.

It is necessary to unify the orientation of the inserts 310 to some extent. That is, it is necessary to embed each insert 310 in an embedding opening 304 such that an angle, formed by a line which connects the injection hole 314 to the measurement hole 315 with respect to the Y axis, becomes small. Specifically, it is necessary that the angle, formed by the line which connects the injection hole 314 to the measurement hole 315 with respect to the Y axis, becomes a size in a range from −10° to +10°.

In the preprocessing of the automatic charging method, the automatic charging apparatus 100 operates as below.

The storage unit 139 stores insert coordinate data in advance. The insert coordinate data includes a coordinate value of each insert 310. The origin of coordinates in the insert coordinate data is the origin $O_P$ of the panel 300. Specifically, the insert coordinate data is CAD data. The CAD is an abbreviation of Computer Aided Design.

First, the preprocessing unit 131 selects two coordinate values of a reference insert from the insert coordinate data. The reference insert is the insert 310 which becomes reference. Specifically, the reference insert includes the insert 310 which is relatively close to the origin $O_P$ and the insert 310 which is relatively far from the origin $O_P$.

Subsequently, the preprocessing unit 131 calculates movement amount based on a coordinate value of the reference insert.

Subsequently, the preprocessing unit 131 outputs a movement instruction to the movement stage 120 and the movement block 201 based on the calculated movement amount. The movement stage 120 and the movement block 201 receive the movement instruction and move the nozzle 211 above the reference insert.

Subsequently, the preprocessing unit 131 outputs a capturing instruction to the camera 250. The camera 250 receives the capturing instruction, captures the reference insert, and acquires an image. Furthermore, the camera 250 outputs the obtained image to the preprocessing unit 131.

Subsequently, the preprocessing unit 131 receives the image, and calculates position deviation amount and angle deviation amount of the reference insert in the image. The position deviation amount of the reference insert indicates a size of deviation between a coordinate value of the reference insert in the insert coordinate data and a coordinate value of the reference insert in the image. The angle deviation amount of the reference insert indicates an angle, formed by a line which is obtained by connecting the two coordinate values of the two reference inserts in the insert coordinate data with respect to a line which is obtained by connecting the coordinate values of two points of two reference inserts in the image.

Furthermore, the preprocessing unit 131 converts the coordinate value of the reference insert in the insert coordinate data into a coordinate value obtained in a case where a coordinate axis in the insert coordinate data is rotated by the angle deviation amount. Thereafter, the preprocessing unit 131 adds the position deviation amount to the coordinate value of the reference insert in the insert coordinate data.

Figure 9:
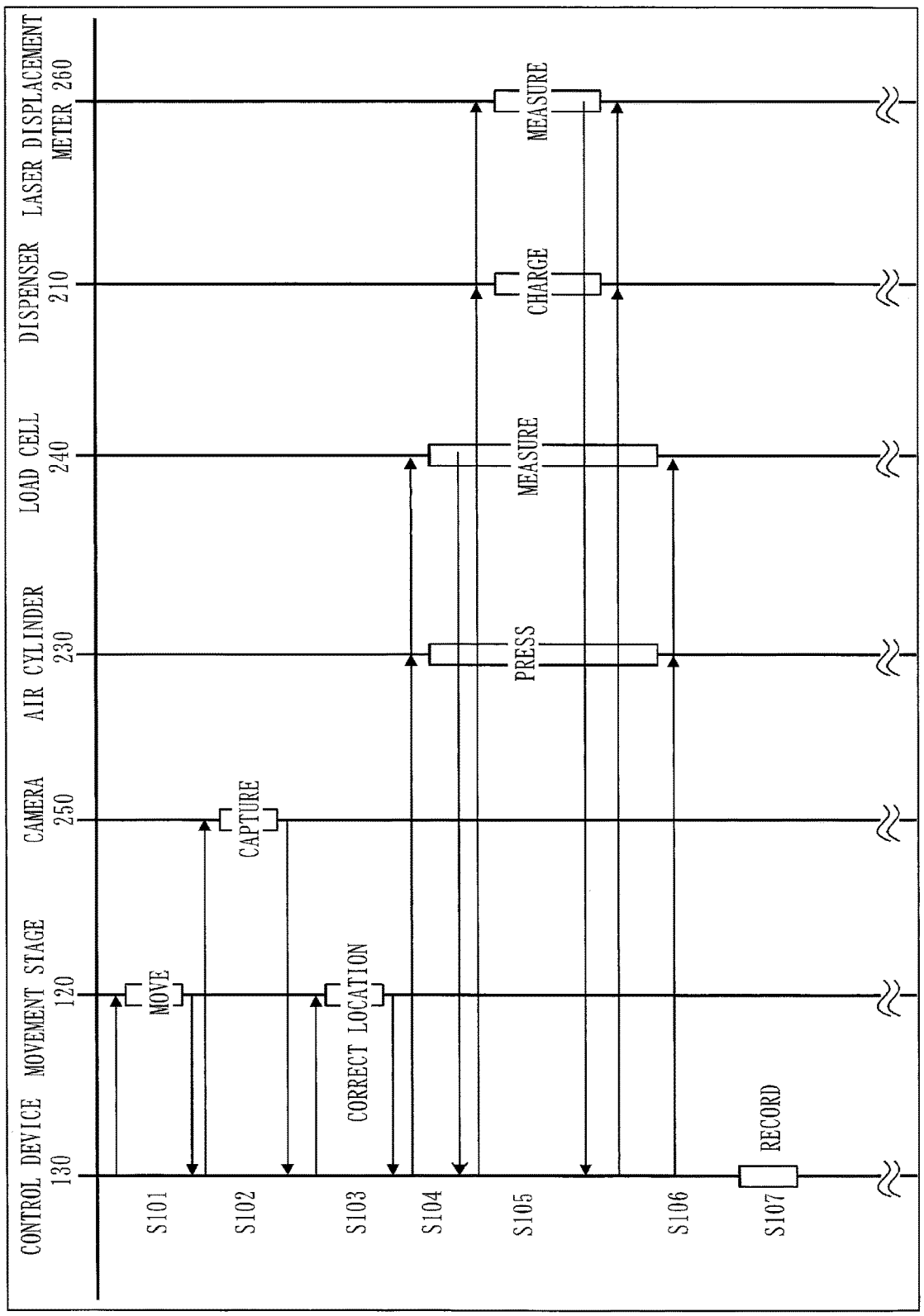
FIG. 9 is a sequence diagram illustrating an automatic charging method according to the first embodiment.

The automatic charging method will be described with reference to FIG. 9.

The automatic charging method is a method for causing the gap 305 between the insert 310 and the honeycomb core 301 to be filled with the filler.

The automatic charging method is performed after the preprocessing is performed.

In the automatic charging method, processes from step S101 to step S107 are performed for every insert 310.

Step S101 is a step for causing the nozzle 211 to move above the insert 310. Step S101 will be described below.

First, the control unit 132 selects the coordinate value of the insert 310 from the insert coordinate data.

Subsequently, the control unit 132 calculates the movement amount based on the location information and the coordinate value of the insert 310.

Subsequently, the control unit 132 outputs the movement instruction to the movement stage 120 based on the calculated movement amount. In addition, the control unit 132 updates the location information based on the calculated movement amount.

Furthermore, the movement stage 120 receives the movement instruction and moves the nozzle 211 above the insert 310.

Meanwhile, the air cylinder 230 pulls up the dispenser 210 through the base plate 203 using force opposing weight of a component including the dispenser 210. Therefore, the component including the dispenser 210 does not descend according to the weight. The component including the dispenser 210 corresponds to the dispenser 210, the base plate 203, the first tank 221, the second tank 222, the base plate 203, and the linear guide 202.

Step S102 is a step for measuring the deviation amount of the injection hole 314 in the insert 310 and the deviation amount of the measurement hole 315 in the insert 310. The deviation amount of the injection hole 314 indicates a size of deviation between a reference location for the injection hole 314 and a location of the injection hole 314. The deviation amount of the measurement hole 315 indicates a size of deviation in XY coordinates between the reference location for the measurement hole 315 and a location of the measurement hole 315. Step S102 will be described below.

First, the control unit 132 outputs the capturing instruction to the camera 250.

Subsequently, the camera 250 receives the capturing instruction, captures the insert 310, and acquires an image.

Subsequently, the camera 250 detects the injection hole 314 of the insert 310 from the image, and calculates the location of the injection hole 314 of the insert 310 in the image. In addition, the camera 250 detects the measurement hole 315 of the insert 310 from the image, and calculates the location of the measurement hole 315 of the insert 310 in the image.

Subsequently, the camera 250 outputs a detection result, which shows the location of the injection hole 314 of the insert 310 in the image and the location of the measurement hole 315 of the insert 310 in the image, to the control unit 132. The control unit 132 receives the detection result.

Furthermore, the control unit 132 calculates the deviation amount of the injection hole 314 in the insert 310 based on the location of the injection hole 314 of the insert 310 in the image. In addition, the control unit 132 calculates the deviation amount of the measurement hole 315 in the insert 310 based on the location of the measurement hole 315 of the insert 310 in the image.

Step S103 is a step for correcting the location of the nozzle 211 and the location of the laser displacement meter 260. Step S103 will be described below.

First, the control unit 132 outputs the movement instruction to the movement stage 120 based on the deviation amount of the injection hole 314 in the insert 310. In addition, the control unit 132 updates the location information based on the deviation amount of the injection hole 314 of the insert 310.

Furthermore, the movement stage 120 receives the movement instruction, and moves the discharge port 212 of the nozzle 211 above the injection hole 314 of the insert 310.

Furthermore, the control unit 132 outputs the movement instruction to the adjustment guide 261 based on the deviation amount of the measurement hole 315 in the insert 310.

Furthermore, the adjustment guide 261 receives the movement instruction, and moves the laser displacement meter 260. Specifically, the adjustment guide 261 moves the laser displacement meter 260 to a location where the laser beam is emitted toward the measurement hole 315.

Step S104 is a step for pressing the edge of the discharge port 212 of the nozzle 211 on the edge of the injection hole 314 of the insert 310. Step S104 will be described below.

First, the control unit 132 outputs a descending instruction to the movement block 201. The movement block 201 receives the descending instruction, and moves the nozzle 211 to the lower side. Specifically, the movement block 201 outputs the descending instruction until the edge of the discharge port 212 of the nozzle 211 comes into contact with the edge of the injection hole 314 of the insert 310.

Subsequently, the control unit 132 outputs a measurement instruction to the load cell 240. The load cell 240 receives the measurement instruction, and starts measurement of the pressing force. The pressing force is force applied from the air cylinder 230 to the nozzle 211. After the measurement of the pressing force starts, the load cell 240 repeats the measurement of the pressing force until the measurement of the pressing force stops, and outputs a measurement result to the control unit 132 whenever the pressing force is measured. The measurement result indicates the measured pressing force.

Furthermore, the control unit 132 outputs a press instruction to the air cylinder 230 based on the pressing force indicated by the measurement result whenever the measurement result is received. The air cylinder 230 receives the press instruction, and presses the dispenser 210 down through the base plate 203. Therefore, the edge of the discharge port 212 of the nozzle 211 is pressed on the edge of the injection hole 314 of the insert 310 to an extent that the pressing force falls in a pressing force range.

Figure 10:
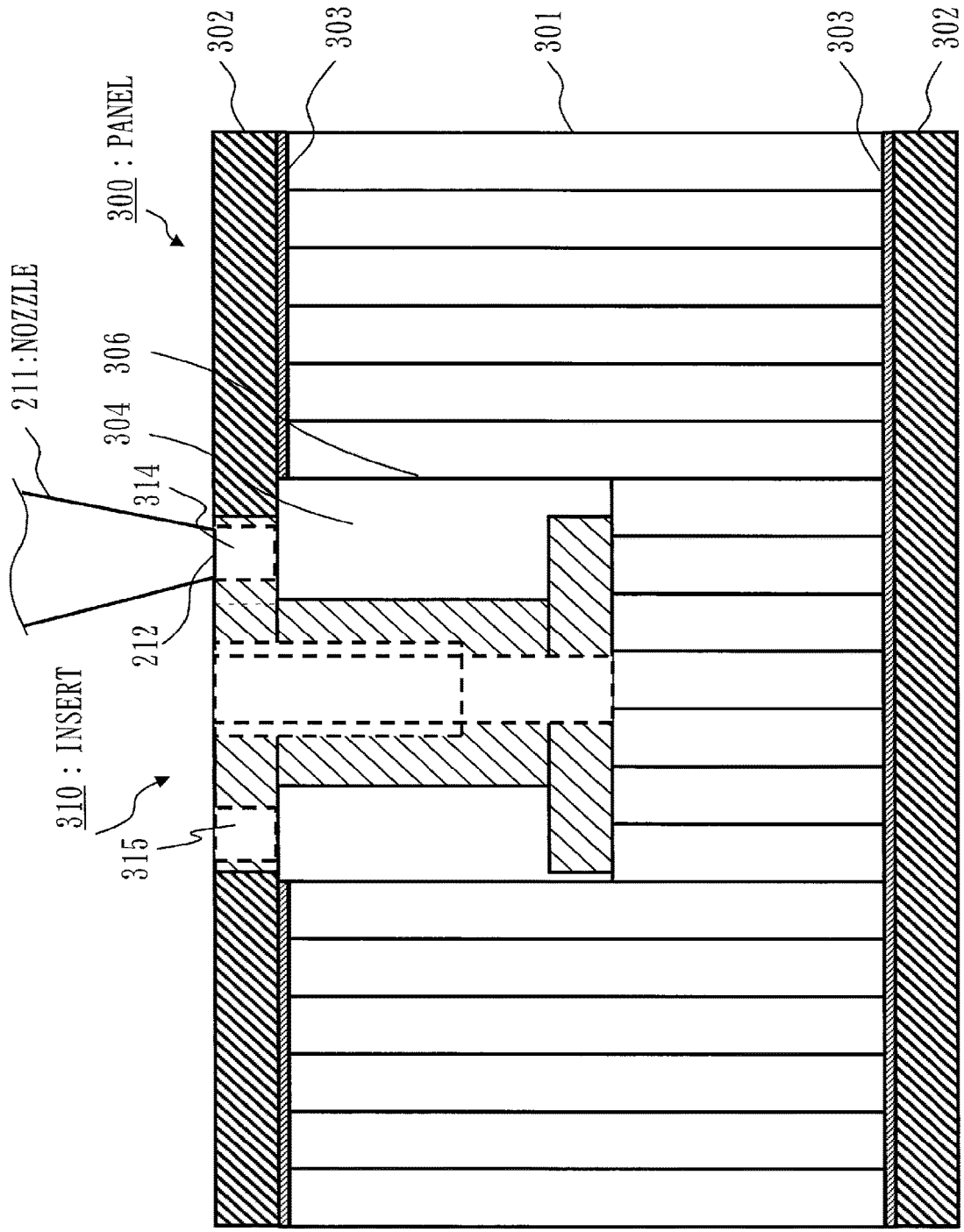
FIG. 10 is a sectional side view illustrating the panel 300 according to the first embodiment.

States of the panel 300, the insert 310, and the nozzle 211, which are obtained after step S104 is performed, will be described with reference to FIG. 10.

The insert 310 is embedded in the embedding opening 304 of the panel 300.

The edge of the discharge port 212 of the nozzle 211 is pressed on the edge of the injection hole 314 of the insert 310.

Returning to FIG. 9, description will be continued from step S105.

Step S105 is a step for causing the gap 305 between the insert 310 and the honeycomb core 301 to be filled with the filler. Step S105 will be described below.

First, the control unit 132 outputs the measurement instruction to the laser displacement meter 260. The laser displacement meter 260 receives the measurement instruction and starts measurement of a liquid surface distance. The liquid surface distance is a distance from the injection hole 314 of the insert 310 to the liquid surface of the injected filler. Specifically, the laser displacement meter 260 emits the laser beam toward the measurement hole 315 of the insert 310, and receives the laser beam which is reflected in the liquid surface of the filler. Furthermore, the laser displacement meter 260 calculates the liquid surface distance based on time taking from emitting the laser beam until receiving the laser beam. Until the measurement of the liquid surface distance stops after the measurement of the liquid surface distance starts, the laser displacement meter 260 repeats the measurement of the liquid surface distance, and outputs the measurement result to the control unit 132 whenever the liquid surface distance is measured. The measurement result indicates the measured liquid surface distance.

Subsequently, the control unit 132 outputs a charging instruction to the dispenser 210. The dispenser 210 receives the charging instruction, and starts discharge of the filler. After the discharge of the filler starts, the dispenser 210 discharges the filler from the discharge port 212 of the nozzle 211 until the discharge of the filler stops. Meanwhile, a charging speed is uniform. Specifically, the dispenser 210 injects the main agent and the curing agent into the nozzle 211. If so, the nozzle 211 stirs and mixes the main agent and the curing agent, and discharges an adhesive, in which the main agent is mixed with the curing agent, from the discharge port 212. The discharged adhesive is injected from the injection hole 314 of the insert 310, and fills the gap 305 between the insert 310 and the honeycomb core 301. Meanwhile, the dispenser 210 replenishes the main agent from the first tank 221 in a case where the main agent is not sufficient, and replenishes the curing agent from the second tank 222 in a case where the curing agent is not sufficient.

Subsequently, whenever the control unit 132 receives the measurement result from the laser displacement meter 260, the control unit 132 calculates a height of the liquid surface of the filler based on the liquid surface distance indicated by the measurement result.

Furthermore, the control unit 132 determines whether or not the height of the liquid surface of the filler reaches a target height. The target height is a predetermined height. Specifically, the target height is the same as the height of the surface of the upper flange 311 of the insert 310. In a case where the height of the liquid surface of the filler reaches the target height, the control unit 132 outputs a charging stop instruction to the dispenser 210. The dispenser 210 receives the charging stop instruction and stops the discharge of the filler.

States of the panel 300, the insert 310, and the nozzle 211, which are obtained after step S105 is performed, will be described with reference to FIG. 11. The filler is illustrated using half-tone dot meshing.

The gap 305 between the insert 310 and the honeycomb core 301 is filled with the filler which is discharged from the discharge port 212 of the nozzle 211 and is injected from the injection hole 314 of the insert 310.

The liquid surface of the filler reaches the surface of the insert 310. Meanwhile, the liquid surface of the filler is detected by a laser beam 263 from the laser displacement meter 260.

The range which is filled with the filler will be described with reference to FIG. 12, FIG. 13, and FIG. 14. The filler is expressed by half-tone dot meshing.

Figure 11:
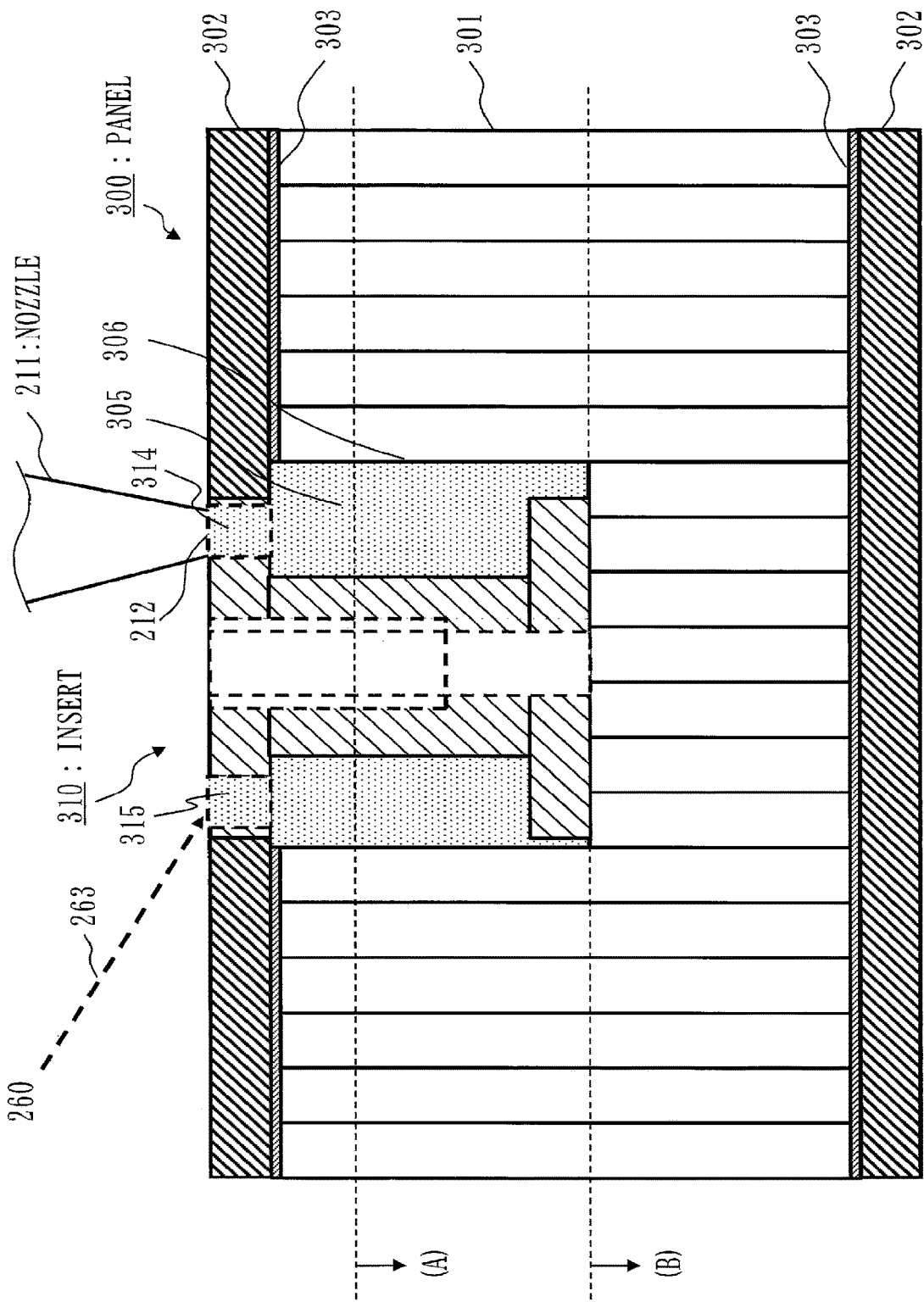
FIG. 11 is a sectional side view illustrating the panel 300 according to the first embodiment.
Figure 12:
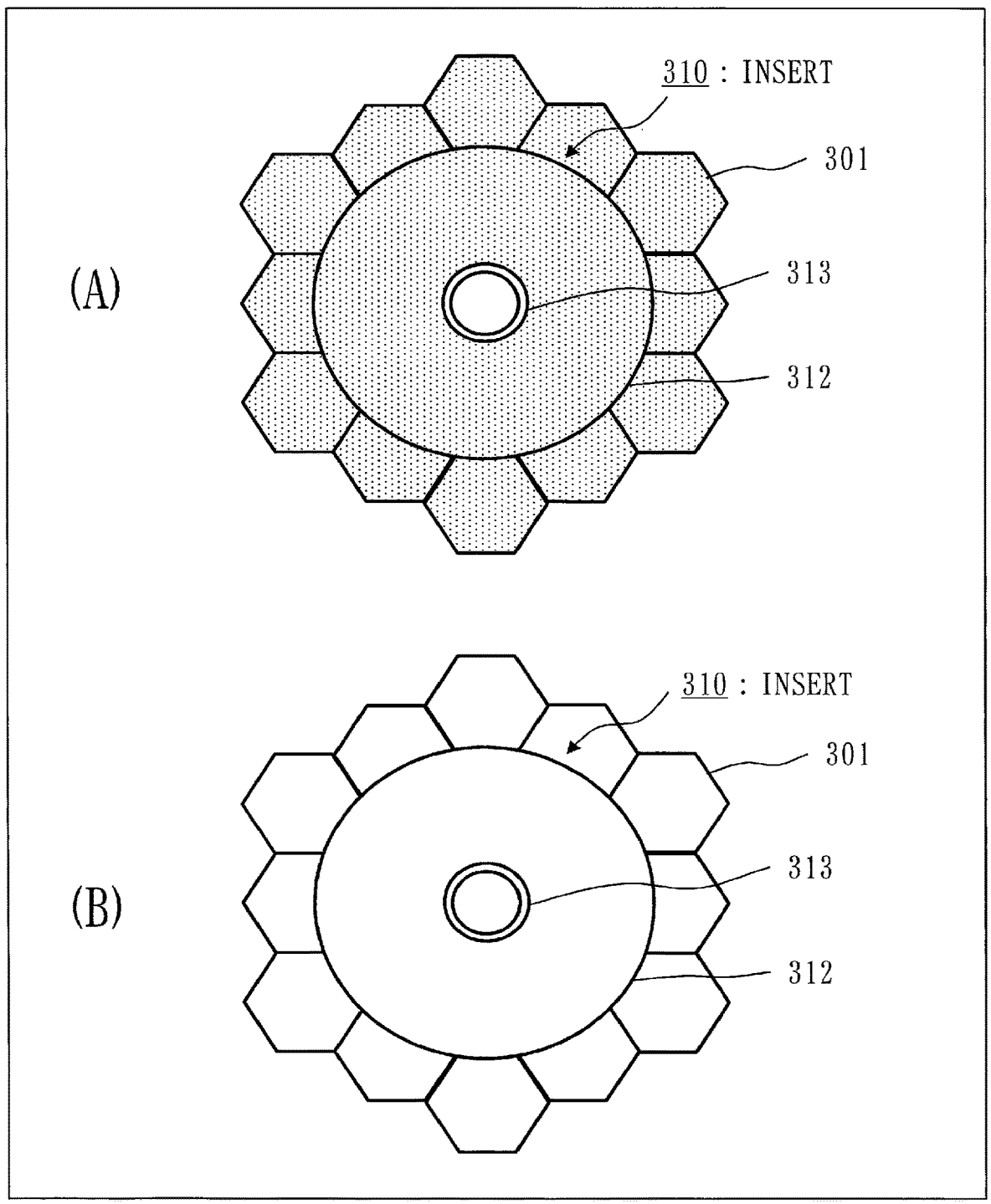
FIG. 12 is a diagram illustrating a charging pattern according to the first embodiment.
Figure 13:
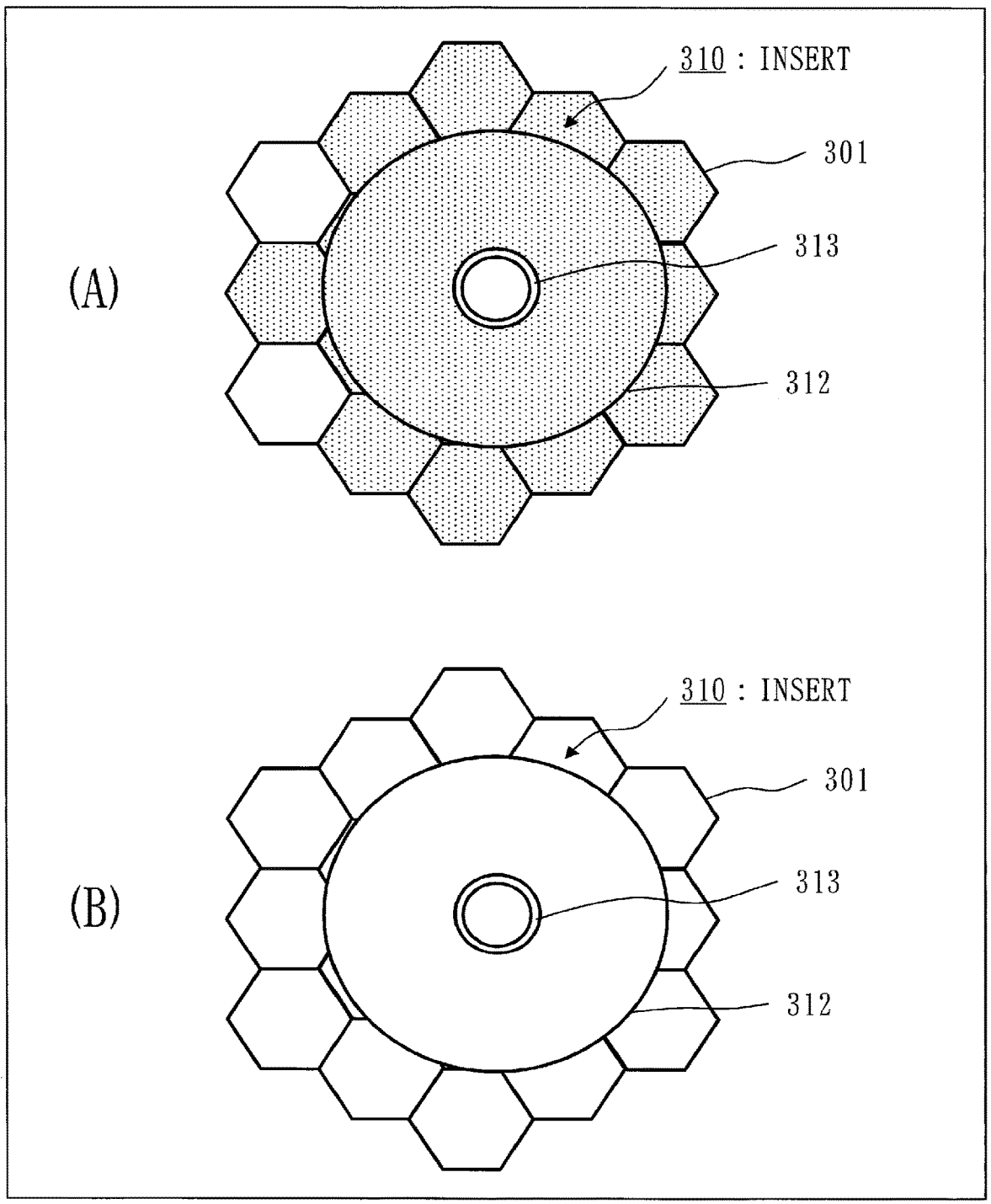
FIG. 13 is a diagram illustrating the charging pattern according to the first embodiment.
Figure 14:
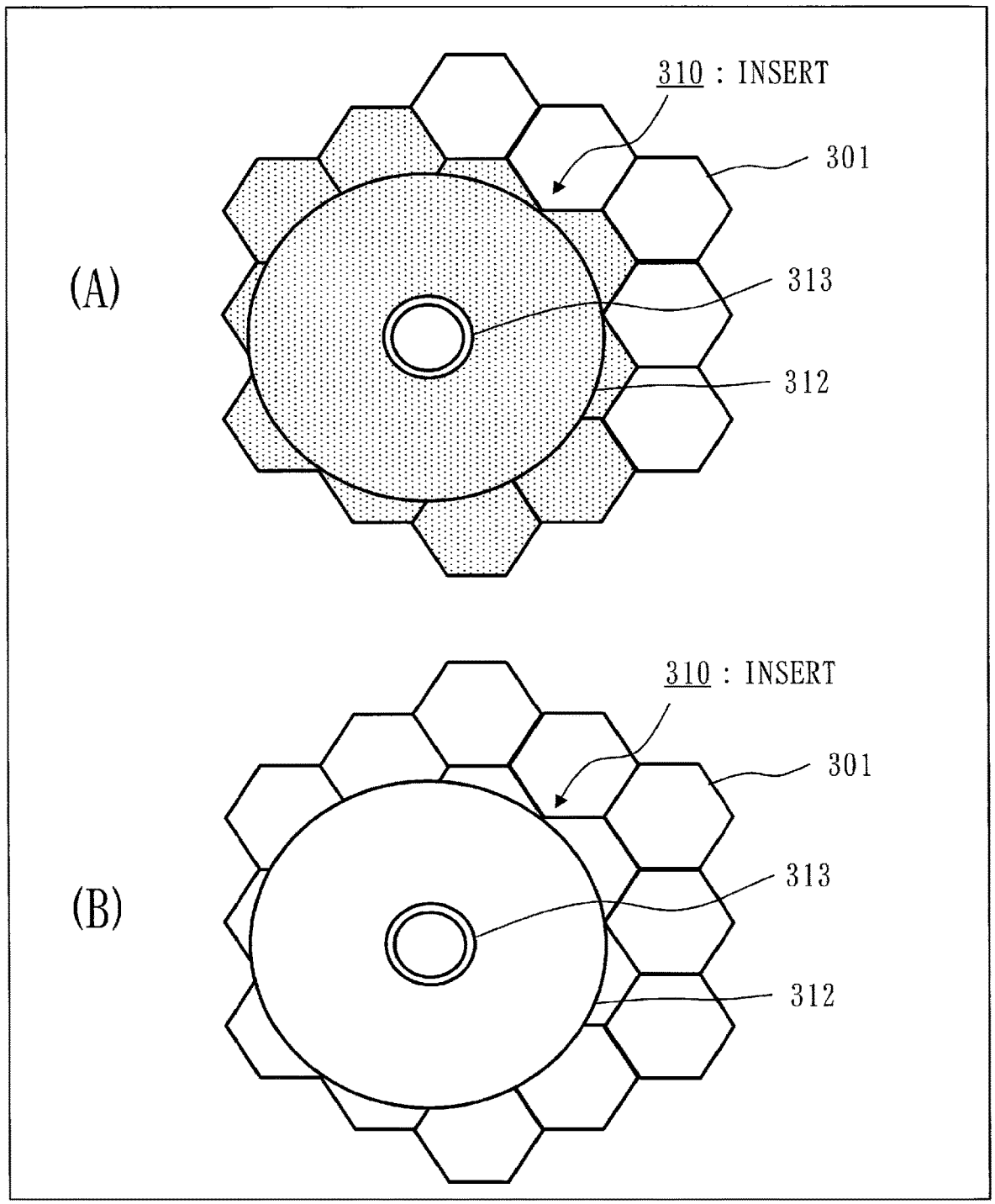
FIG. 14 is a diagram illustrating the charging pattern according to the first embodiment.

(A) of FIG. 12, (A) of FIG. 13, and (A) of FIG. 14 are plan views illustrating peripheries of the insert 310 in (A) of FIG. 11, and (B) of FIG. 12, (B) of FIG. 13, and (B) of FIG. 14 are plan views illustrating peripheries of the insert 310 in (B) of FIG. 11.

As illustrated in (A) of FIG. 12, (A) of FIG. 13, and (A) of FIG. 14, the peripheries of the flange shaft 313 of the insert 310 are filled with the filler in a case where the locational relationship between the insert 310 and the honeycomb core 301 shows any pattern. In addition, parts of the honeycomb core 301, which are adjacent to the insert 310, are filled with the filler. In contrast, parts of the honeycomb core 301, which are not adjacent to the insert 310, are not filled with the filler.

As illustrated in (B) of FIG. 12, (B) of FIG. 13, and (B) of FIG. 14, a lower side of the insert 310 is not filled with the filler in a case where the locational relationship between the insert 310 and the honeycomb core 301 shows any pattern. That is, the lower part of the honeycomb core 301 is not filled with the filler, and thus the panel 300 is not extremely heavy after the panel 300 is filled with the filler. The reason for this is that a flow-stop treatment is given. Specifically, the flow-stop treatment using a GFRP plate is given. The GFRP is an abbreviation of Glass Fiber Reinforced Plastic.

Returning to FIG. 9, description will be performed from step S106.

Step S106 is a step for separating the edge of the discharge port 212 of the nozzle 211 from the edge of the injection hole 314 of the insert 310. Step S106 will be described below.

First, the control unit 132 outputs a press stop instruction to the air cylinder 230. The air cylinder 230 receives the press stop instruction, and pulls up the dispenser 210 through the base plate 203 using the force opposing weight of the component including the dispenser 210.

Subsequently, the control unit 132 outputs the measurement stop instruction to the load cell 240. The load cell 240 receives the measurement stop instruction, and stops the measurement of the pressing force.

Furthermore, the control unit 132 outputs an ascending instruction to the movement block 201. The movement block 201 receives the ascending instruction, and moves the nozzle 211 above. Specifically, the movement block 201 separates the edge of the discharge port 212 of the nozzle 211 from the edge of the injection hole 314 of the insert 310 until an interval between the edge of the discharge port 212 of the nozzle 211 and the edge of the injection hole 314 of the insert 310 becomes a first interval.

Step S107 is a step for recording operation history. Step S107 will be described below.

The storage unit 139 stores an operation history file in advance. The operation history file includes the operation history for each performed operation. The recording unit 133 records the operation history of operations performed in processes from step S101 to S106 in the operation history file. Specifically, the recording unit 133 records an insert identifier, a charging date and time, and the like in the operation history file. The insert identifier is an identifier which identifies the insert 310. The charging date and time is date and time in which the filler is injected from the injection hole 314 of the insert 310 and fills the gap 305 between the insert 310 and the honeycomb core 301. Specifically, the charging date and time is date and time in which the charging instruction is output and date and time in which the charging stop instruction is output.

Advantage of First Embodiment

According to the first embodiment, it is possible to charge a filler automatically.

Specifically, it is possible to bond a metal component, which is used to connect a member or a device, to the honeycomb sandwich panel used for a structure, such as an artificial satellite, a flying object, or an automotive shelter, with an adhesive using the automatic charging apparatus.

Therefore, it is possible to simplify an adhesive charging operation and a work record keeping operation.

The honeycomb core of the honeycomb sandwich panel is obtained by combining polygons in a cross section. Therefore, since the amount of adhesive to be charged becomes different according to the location of the insert and a shape of the honeycomb core, it is not possible to uniquely determine the charging amount. However, according to the first embodiment, it is possible to cause the adhesive corresponding to necessary amount to be charged according to the location of the insert and the shape of the honeycomb core.

In the first embodiment, the driving head 200 includes the dispenser and the tank which are used for the main agent, and, furthermore, includes the dispenser and the tank which are used for the curing agent.

A counter flow is generated because the main agent and the curing agent are pressed back due to pressure generated in a case where the main agent and the curing agent are discharged and are mixed in the static mixer (nozzle 211).

The dispenser used for the curing agent has a small discharging force compared to the dispenser used for the main agent, and the counter flow is easily generated.

Here, a flow path of the curing agent may be narrow. Therefore, curing agent discharge pressure increases, and thus it is possible to prevent the counter flow from being generated. Specifically, a diameter of the flow path may be designed such that a size of force, which is necessary to discharge the curing agent, falls in a dispenser performance range.

In the first embodiment, the pressing force is measured by the load cell, and the nozzle is pressed on the insert by the air cylinder with appropriate pressing force. That is, even in a case where the amount of filler stored in the tank changes, it is possible to press the nozzle on the insert with appropriate pressing force. Therefore, the adhesive does not leak out from the insert. In addition, even in a case where the nozzle is pressed on the insert, the honeycomb sandwich panel is not damaged.

Second Embodiment

Figure 15:
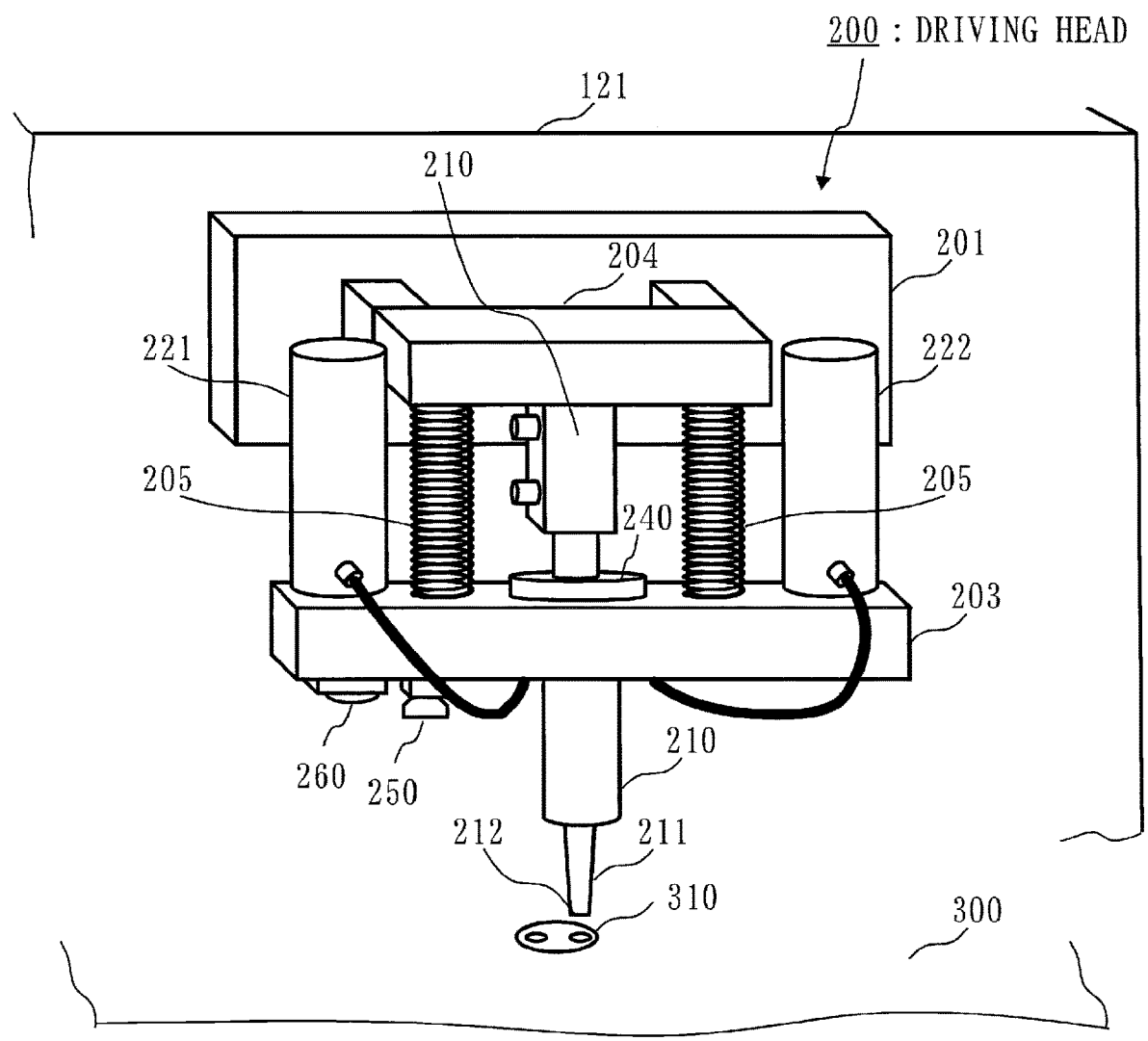
FIG. 15 is a configuration diagram illustrating a driving head 200 according to a second embodiment.

An aspect in which pulling force opposing the weight of the component including the dispenser 210 is generated using a spring will be described based on difference from the first embodiment with reference to FIG. 15.

Description of Configuration

The configuration of the automatic charging apparatus 100, the structure of the panel 300, and the structure of the insert 310 are the same as in the first embodiment.

A configuration of the driving head 200 will be described with reference to FIG. 15.

Meanwhile, the air cylinder 230 is simplified and illustrated. Specifically, the first pipe 231, the second pipe 232, the regulator 233, and the piston 234 are not illustrated. In addition, the adjustment guide 261 and the base plate 262, which are used to move the laser displacement meter 260, are not illustrated.

The driving head 200 includes a fixing block 204 and two springs 205 in addition to the elements which are described according to the first embodiment.

The fixing block 204 is fixed to the movement block 201. The dispenser 210 is attached to the fixing block 204. In a case where the movement block 201 moves upward and downward, the fixing block 204 moves upward and downward together with the movement block 201.

The base plate 203 is disposed on a lower side of the fixing block 204. The first tank 221 and the second tank 222 are attached to an upper surface of the base plate 203. Meanwhile, the first tank 221 is disposed at a left end of the base plate 203, and the second tank 222 is disposed at a right end of the base plate 203. In addition, the dispenser 210 is attached to a lower surface of the base plate 203. Meanwhile, the dispenser 210 is disposed at a center of the base plate 203.

The two springs 205 are provided between the fixing block 204 and the base plate 203. Meanwhile, the two springs 205 are disposed on right and left sides while interposing the dispenser 210 therebetween.

The two springs 205 pull the base plate 203 up with the pulling force opposing the weight of the component including the dispenser 210. Specifically, the component including the dispenser 210 includes the dispenser 210, the base plate 203, the first tank 221, and the second tank 222.

Description of Operation

In the automatic charging method, a component, which causes the pulling force opposing the weight of the component including the dispenser 210 to be generated, is not the dispenser 210 but the two springs 205.

With regard to others, the automatic charging method is the same as in the first embodiment.

Advantage of Second Embodiment

Since the springs cause the pulling force opposing the weight of the component including the dispenser to be generated, it is possible to reduce a load of the dispenser 210.

Furthermore, the same advantage as in the first embodiment is obtained.

Supplement of Embodiment

In the embodiment, the function of the control device 130 may be realized by hardware.

Figure 16:
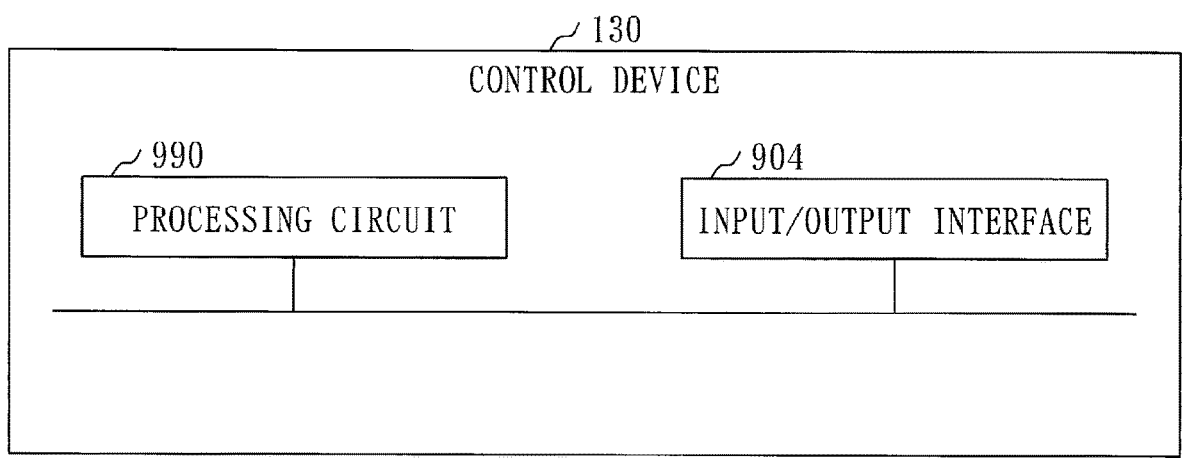
FIG. 16 is a hardware configuration diagram illustrating a control device 130 according to each embodiment.

FIG. 16 illustrates a configuration in a case where the function of the control device 130 is realized by hardware.

The control device 130 includes a processing circuit 990. The processing circuit 990 is referred to as a processing circuitry.

The processing circuit 990 is a dedicated-electronic circuit which realizes the functional elements such as the preprocessing unit 131, the control unit 132, the recording unit 133, and the storage unit 139.

Specifically, the processing circuit 990 is a single circuit, a multiple circuit, a programmed processor, a parallel-programmed processor, a logic IC, GA, ASIC, FPGA, or a combination thereof. The GA is an abbreviation of Gate Array, the ASIC is an abbreviation of Application Specific Integrated Circuit, and the FPGA is an abbreviation of Field Programmable Gate Array.

The control device 130 may include a plurality of processing circuits which replace the processing circuit 990. The plurality of processing circuits perform division and take charge of roles of the functional elements.

The function of the control device 130 may be realized by combining software and hardware. That is, some of the functional elements may be realized by software and the remaining functional elements may be realized by hardware. In addition, the functional elements may be realized by firmware.

The embodiments are examples of preferable aspects, and do not intend to limit a technical scope of the present invention. The embodiments may be implemented partially, or may be implemented by combining with another embodiment. The above-described procedures which have been described with reference to the arrangement of the components, a sequence diagram, and the like may be appropriately changed using.

REFERENCE SIGNS LIST

100: automatic charging apparatus, 110: operation stage, 120: movement stage, 121: rail, 130: control device, 131: preprocessing unit, 132: control unit, 133: recording unit, 139: storage unit, 200: driving head, 201: movement block, 202: linear guide, 203: base plate, 204: fixing block, 205: spring, 210: dispenser, 211: nozzle, 212: discharge port, 221: first tank, 222: second tank, 230: air cylinder, 231: first pipe, 232: second pipe, 233: regulator, 234: piston, 240: load cell, 250: camera, 260: laser displacement meter, 261: adjustment guide, 262: base plate, 263: laser beam, 300: panel, 301: honeycomb core, 302: epidermis material, 303: adhesive sheet, 304: embedding opening, 305: gap, 306: wall, 310: insert, 311: upper flange, 312: lower flange, 313: flange shaft, 314: injection hole, 315: measurement hole, 316: screw opening, 317: axial hole, 901: processor, 902: memory, 903: auxiliary storage device, 904: input/output interface, 990: processing circuit.

The invention claimed is:

1. An automatic charging apparatus comprising:
   an operation stage on which a panel is placed, the panel being provided with an embedding opening in which an insert is embedded;
   a dispenser that includes a cone-shaped nozzle having, at a distal end thereof, a discharge port through which a filler injected from an injection hole provided in the insert is discharged;
   tanks for an adhesive that move with the dispenser upward and downward;
   an air cylinder connected to the dispenser such that an edge of the discharge port of the dispenser is pressed up against an edge of the injection hole of the insert by force of air; and a load cell to measure pressing force which causes the edge of the discharge port of the dispenser to be pressed up against the edge of the injection hole of the insert, wherein the air cylinder presses the edge of the discharge port of the dispenser up against the edge of the injection hole of the insert to an extent that the pressing force falls in a pressing force range, wherein the insert includes an upper flange, a lower flange, and a flange shaft which connects the upper flange to the lower flange, wherein a height of the insert is approximately the same as a depth of the embedding opening, wherein a height of a surface of the upper flange of the insert is approximately the same as a height of a surface of an upper-side epidermis material of the panel, in a state where the insert is embedded in the embedding opening, wherein the upper flange includes a measurement hole and the injection hole, wherein the apparatus further comprises a laser displacement meter to emit a laser beam toward the measurement hole, and to measure a distance from the injection hole to a liquid surface of the injected filler, and wherein the dispenser discharges the filler until a height of the liquid surface of the filler reaches a target height based on the measured distance.

2. The automatic charging apparatus according to claim 1, further comprising:

a movement stage to move the dispenser above the insert;

a camera to capture the insert and to acquire an image of the insert after the dispenser is moved above the insert; and an adjustment guide to move the laser displacement meter to a location where the laser beam is emitted toward the measurement hole based on a location of the measurement hole in the image.

3. The automatic charging apparatus according to claim 1, further comprising:

a movement stage to move the dispenser above the insert; and a camera to capture the insert and to acquire an image of the insert after the dispenser is moved above the insert, wherein the movement stage moves the discharge port of the dispenser above the injection hole of the insert based on a location of the injection hole of the insert in the image.

4. The automatic charging apparatus according to claim 1, further comprising:

a movement stage to move the dispenser above the insert; and a movement block to cause the edge of the discharge port of the dispenser to approach the edge of the injection hole of the insert until the edge of the discharge port of the dispenser comes into contact with the edge of the injection hole of the insert after the dispenser is moved above the insert, wherein the air cylinder presses the edge of the discharge port of the dispenser on the edge of the injection hole of the insert after the edge of the discharge port of the dispenser comes into contact with the edge of the injection hole of the insert.

5. The automatic charging apparatus according to claim 1, further comprising:

a first tank to store a first liquid which forms the filler; and a second tank to store a second liquid which forms the filler, wherein the dispenser includes a static mixer as a nozzle having the discharge port at a tip, and wherein the static mixer stirs and mixes the first liquid supplied from the first tank with the second liquid supplied from the second tank, and discharges a mixed liquid, which is obtained by mixing the first liquid with the second liquid, from the discharge port as the filler.

6. The automatic charging apparatus according to claim 1, wherein the panel is a honeycomb sandwich panel that includes a honeycomb core provided with an embedding opening in which the insert is embedded, and wherein the filler is an adhesive which fills a gap between the insert and the honeycomb core and which fixes the insert to the honeycomb core.

7. The automatic charging apparatus according to claim 1, wherein, in a step before a step of pressing the edge of the discharge port of the dispenser on the edge of the injection hole of the insert, the air cylinder pulls the dispenser up with the pulling force opposing a weight of a component including the dispenser.

8. The automatic charging apparatus according to claim 1, further comprising:

a movement block to move the dispenser upward and downward;

a fixing block to which the air cylinder is attached and which is fixed to the movement block;

a base plate to which the dispenser is attached and which is disposed on a lower side of the fixing block; and a spring provided between the fixing block and the base plate and to pull the base plate up with the pulling force opposing a weight of a component including the dispenser.

9. The automatic charging apparatus according to claim 1, further comprising a driving head, wherein the dispenser, the tanks, the air cylinder, and the load cell are included in the driving head.

* * * * *